July 18, 1950     F. W. ARMSTRONG, JR     2,515,176
METHOD OF CLAD PLATE RESISTANCE WELDING Filed Oct. 7, 1947     3 Sheets-Sheet 1

INVENTOR
Frank W. Armstrong, Jr.
BY
    ATTORNEY

July 18, 1950   F. W. ARMSTRONG, JR   2,515,176
METHOD OF CLAD PLATE RESISTANCE WELDING
Filed Oct. 7, 1947   3 Sheets-Sheet 3

INVENTOR
Frank W. Armstrong, Jr.
BY
ATTORNEY

Patented July 18, 1950

2,515,176

UNITED STATES PATENT OFFICE 2,515,176

METHOD OF CLAD PLATE RESISTANCE WELDING

Frank W. Armstrong, Jr., Barberton, Ohio, assignor to The Babcock & Wilcox Company, Rockleigh, N. J., a corporation of New Jersey Application October 7, 1947, Serial No. 778,420

4 Claims. (Cl. 219—10)

This invention relates to clad plate welding, and more particularly to improvements in the method of clad plate welding in which thin sheet metal cladding is welded to a thick base plate by the formation of successive lines of spot welds bonding the sheet and the plate.

In this clad plate method such a large number of spot welds are necessary to bond the sheet and the plate that, from the standpoint of production cost alone, it is important to reduce the number of the welds to a degree consistent with the formation of a good bond between the sheet and the plate. It is also important that the time consumed in the welding operation be reduced to a minimum, again consistent with the production of the effective bond between the sheet and the plate. These factors have led to the use of a rotating electrode through which the welding current and pressures are applied to the alloy face of the plate and sheet assembly, the electrodes having rolling contact with the cladding during the production of the lines of bonding welds.

In this alloy clad plate method the object is to obtain as near a full bond of the alloy sheets to the steel backing material as possible and at the same time obtain consistently good welding over as much of the area as possible. The use of continuously rotating electrodes as commonly applied to resistance seam welding operations has been found, with the aid of certain electrical and mechanical modifications hereinafter described, to result in a resistance welded clad plate with a total bonded area far greater than heretofore possible and with a strength of bond far in excess of the 20,000 p. s. i. minimum shear strength which is recognized by Code authorities as necessary for an integrally bonded plate.

The improvements of the present invention, resulting in uniformly stronger resistance welds on close centers, have resulted from developments taking into account the actions of the electrical circuits involved, the application of pressure to continuously moving electrodes, and the developed surface contact resistances. Each of these factors have been found to exercise an important influence upon shunt current problems, which, in turn, determine, to a large degree, the character and strength of the successive welds involved.

In the commercial welding of an alloy face sheet to a base plate, the optimum results are:

(a) a thermal bond between the alloy face member and the base plate to attain low temperature differential conditions under heat transfer;

(b) a strong uniformly distributed bond between the sheet and the plate in order to maintain the initial welded structural and heat conductive relations.

It has been suggested that such welding be accomplished by initial short current pulses, followed by a final longer current pulse, this multiple pulse welding being accomplished without modification of the contact pressure of the electrodes against the work. In this suggested procedure, the rolling electrodes would be urged against the sheets and plate assembly with a constantly maintained pressure, and the overlapping spacing of the welds in the row obtained by the period of the timing of the pulses.

The present invention improves upon such procedure by avoiding effects which have resulted in non-uniform electrode pressures and ineffective welds. One such effect has been caused by tendency of the electrodes to "toe-in" and thus cause slipping or sliding movement between the electrodes and the work. This is accomplished by substantially reducing, or relieving the electrode pressure upon the sheet subsequent to the completion of each weld and prior to the initiation of the cycle of pulses in the succeeding weld in a row at the next timed position of the electrode. In such pressure relief, the invention contemplates also that the weight of the electrodes may be substantially counterbalanced.

This invention also involves a modification of the character of the welding cycle in that the initial welding step is effected by a current pulse under an initial steady pressure (as distinguished from an impact), while the second step is effected at a short time interval thereafter while the electrode is still in substantially the same position relative to the work, but with a substantially greater steady pressure exerted by the electrode against the work, and with a higher current flow than in the initial phase.

Such a sequence of steps is effective in accomplishment of high heat conductive and structurally strong welds in the completed plate because shunt currents particularly in the final high temperature phase of the weld cycle are minimized and thereby the heating of the metal is more effectively localized in the weld zone, and the tendency of overheating at the electrode contact is also minimized.

The illustrative method will be described by reference to the accompanying drawings in which there is shown preferred apparatus by means of which the method is effected.

Figure 1:
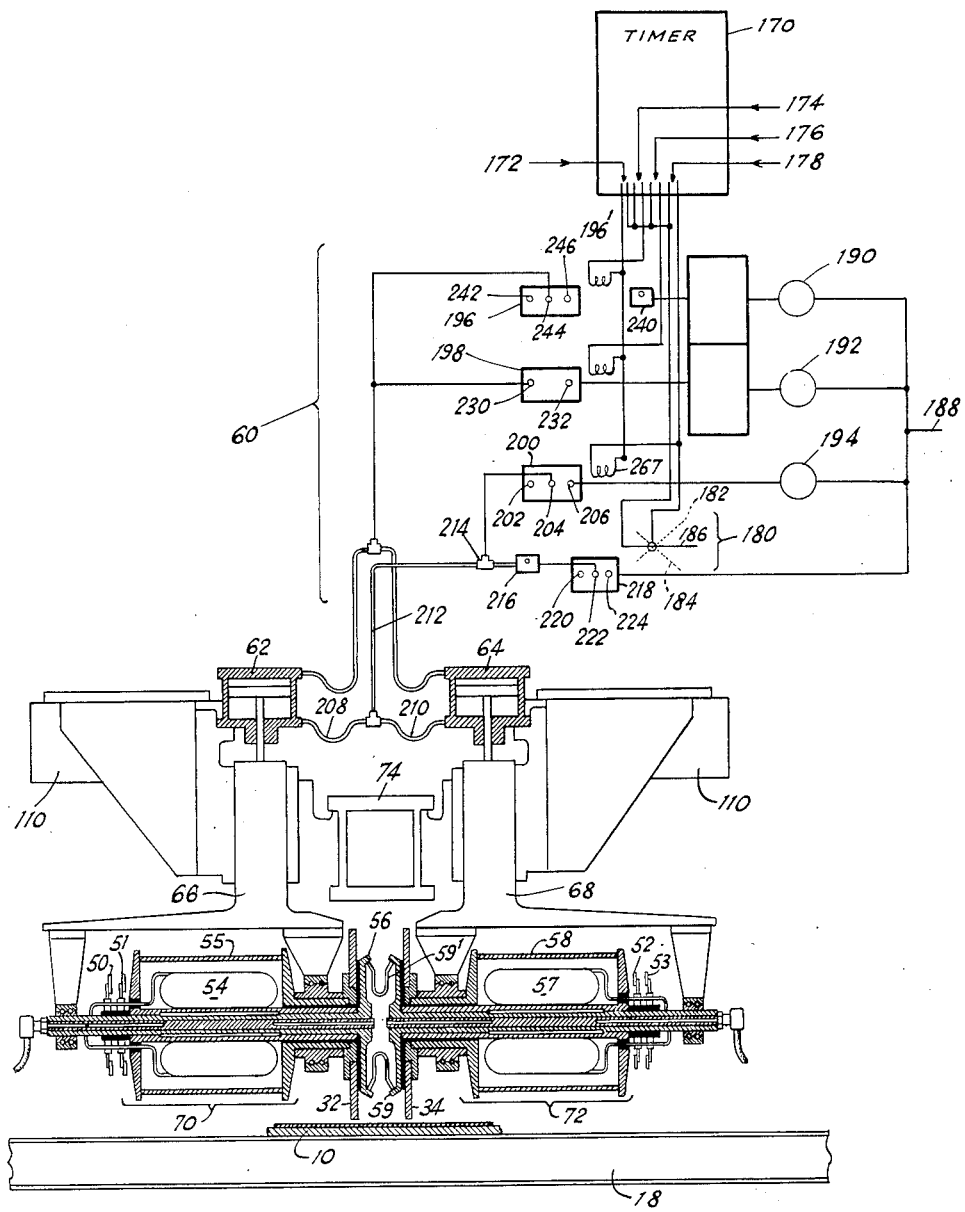
Fig. 1 is a composite view, partly diagrammatic, showing the apparatus by which the illustrative method is effected.

The illustrative method of welding produces clad plates of substantial area. By way of example, a base plate 10 of high carbon steel has immediately superposed thereon a nickel sheet 12 (Fig. 4) and above the nickel sheet there are a plurality of alloy steel sheets 14 and 16. These elements, in the arrangement shown in Fig. 1, are disposed upon fixed supports 18 which are normally disposed within a tank or reservoir and a pair of rolling electrodes such as 32 and 34 are caused to traverse the clad plate assembly from one end to the other and then reversely, forming overlapping resistance welds such as those indicated in the separate rows of welds A, B, C, D, and E, in Fig. 3. The rolling electrodes, after the completion of two rows of resistance welds across the clad plate assembly are moved out of contact with the work and then moved transversely for the formation of other rows of welds in the reverse travel across the clad plate assembly. For example, the rows of resistance welds A and D may be formed by a first traverse of the welding rows in the direction indicated by the arrows 40 and 42 (Fig. 3) and the rows B and E formed on the next succeeding reverse travel across the clad plate assembly.

Considering the welding operation starting with the welds 44 and 46 of rows A and D, the electrodes 32 and 34 are first disposed at these positions and in contact with the upper sheet 14 in the clad plate assembly.

Then an initial steady electrode pressure is exerted downwardly, and simultaneously, initial electrode current is caused to pass from the electrode 32 through the sheets 12, 14, and 16 and into the base plate toward the other electrode 34. These electrodes are the terminals of a high amperage, low voltage secondary, and the current for the initial step of the welding is timed in pulses of a predetermined number of cycles of current. Such current application is controlled by an electrode timer connected through an ignition switching current to the terminals 50—53 (Fig. 1) of the primaries of the transformers of which the electrodes 32 and 34 are the secondary terminals. The terminals 50 and 51 apply to the primary coils 54 with which the casing 55, with its terminals 32 and 56, acts as a single turn secondary. The terminals 52 and 53 similarly apply to the primary coils 57, with which the casing 58, with its terminals 34 and 59, acts as a single turn secondary. The transformer secondaries are series joined by a number of flexible connectors 59′ between terminals 56 and 59.

During the initial welding pulse, electrode pressure against the work, regulated by a pressure regulating system generally indicated at 60 (Fig. 1), is reduced to a minimum value at which the surface contact resistance in the weld zone will not affect the surface of the alloy sheet 14. After a short period (i. e. 15–55 cycles) of initial current flow and a short cooling time (i. e. 5–15 cycles) immediately subsequent thereto, a second pulse of current accompanied by a higher steady electrode pressure is applied. During this second step in the illustrative method, the pressure is substantially higher (i. e. 10–30# gauge) than in the first step. During the second step, the current density of the weld is also increased (i. e. from 350 to 500 primary amperes, from first step to the second). The current pulse of the second step with the accompanying pressure increase gives greater depth of penetration, increases an area of the weld, and allows higher currents to flow for shorter periods (i. e. 10–55 cycles). This is an important factor in successful welding of alloys such as austenitic steels because higher current densities are required to produce effective welds and yet if such higher current densities are utilized for excessively long time periods, the properties of the alloy are apt to be substantially affected.

During the welding steps, the entire welding zone is subject to the cascade flooding of the electrodes with a fluid coolant.

In the illustrative arrangement, the pressure control, including pressure relief, is accomplished through the agency of the pressure regulating system 60 acting through the pressure cylinders 62 and 64 upon the attached vertical cylinders or slides 66 and 68. In the relief of this pressure after the second welding step, it may be said that reverse pressure is applied, substantially counter-balancing the composite welding units 70 and 72 with their electrodes 32 and 34 and the other components which are vertically movable therewith. This re-establishes original conditions for the next cycle of welding steps and gives more consistent welds for the full length of each seam.

Although the cylinders or slides 66 and 68 are keyed against substantial turning movement by parallel rods fixed to the castings from which the slides extend upwardly, and sliding within separate bores in the carriage 110, there is a tendency for the disk electrodes 32 and 34 to "toe-in" as they are operated to effect welds. This tendency, if not counter-acted or eliminated, would cause non-uniform welds. In the operation of the illustrative apparatus, this tendency is prevented from having such an undesirable result, by the relief of all electrode pressure and by the substantial counterbalancing of the weight of the parts vertically movable with slides 66 and 68, after each weld.

Figure 3:
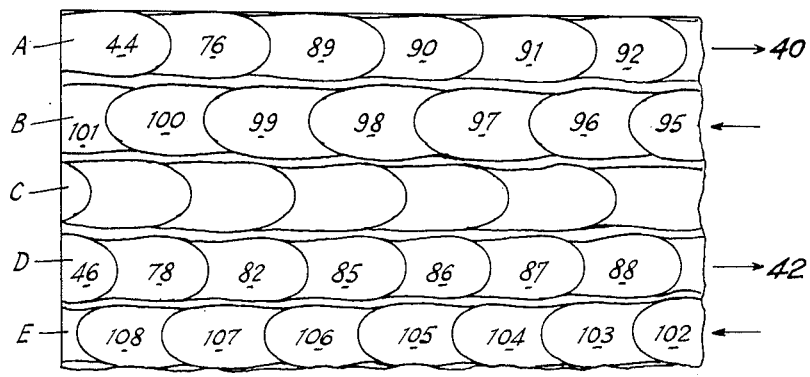
Fig. 3 is a partial plan, showing the relationship of the successive welds in each row, and also the relation of the successive rows of welds, effected by the invention.
Figure 4:
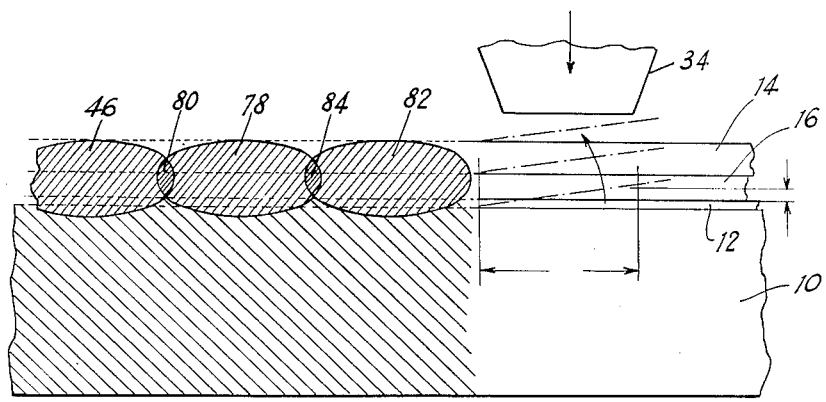
Fig. 4 is a partial vertical section (diagrammatic in its nature showing the overlapping relationship of successive welds in each row.

Assuming that rows A and D of welds (Fig. 3) have been completed, the welding electrodes with their transformers are then raised by moving lever 180 to its up position 182. They are then moved along the bridge 74 (Fig. 1) to succeeding weld row positions such as B and E in Fig. 3, where the welding steps, as above described, are repeated, producing for example such welds as those indicated at 108 and 100 (Fig. 3). The weld 82 is shown as overlapping the weld 78 in the intersecting zone indicated at 84. In a similar manner the weld 46 is shown as having its fusion zone overlapping the fusion zone of weld 78 as indicated at 80.

In Fig. 3 the remaining welds of the seams A and D are indicated at 85–92, inclusive, and the overlapping welds of the next succeeding seams B and E are indicated at 95–108, inclusive.

It will be noted in Fig. 3 that there is indicated a substantial spacing of successive or adjacent rows of overlapping welds. In an illustrative operation of the apparatus, this spacing renders less difficult the problem of forming effective welds in a row or seam adjacent the previously completed seam. The use of welds on close centers over an extended area makes the problem of shunt currents a difficult one. Shunt current is the bypassing of a part or all of the welding current through completed welds rather than through the contact surfaces at the positions of electrode pressure. Where shunt currents are excessive, poor or interrupted welding is apt to result, along with overheating of the electrode contact surface. To overcome the effects of such shunt currents, the center-to-center spacing between individual welds may be increased to such an extent that the current path formed through the completed adjacent weld is one of higher resistance, higher than that formed under the electrode by the pressure contact with the clad material of the electrode roll and the base plate. While the effects of such shunt currents are to be avoided on close center welds such as the welds of the separate seams above indicated, contact resistance between the electrode and the alloy sheet, and between the latter and the base plate, must be reduced to a value low enough to give a voltage drop along this path lower than that along the path involving the completed weld. This is accomplished by use of a high electrode pressure (i. e. 40# gauge to the cylinders 62 and 64). When the distance between adjacent seams, or between the individual welds, is small, the force required to place the alloy sheets in sufficient contact with the base plate to overcome excessive shunt currents is great. The cladding layers may be considered as a beam supported at the weld 82 (Fig. 4) and free on the other or opposite end. The force P required to deflect it may then be in proportion to the square of the alloy thickness. Therefore, an increase in the number of sheets or layers used to make the cladding will make the electrode pressure more effective in obtaining a low enough resistance path for the current to pass through this area in preference to the entire path to the finished weld.

The nickel layer such as 12 (Fig. 4) is used for two basic reasons. First of all, it is an aid in the prevention of carbon migration from the base plate 10 to such alloy sheets as 14 and 16. Secondly, this nickel layer aids materially in increasing the total area bonded to the base plate. The flexibility of the sheets 12, 14 and 16 allows the welding pressure to be effectively transmitted to the surfaces to be joined. Nickel will bond to the steel base plate at a relatively low temperature, and the use of the nickel sheet results in improved heat transfer properties of the resultant clad plate.

The illustrative apparatus is indicated in Fig. 1 as involving two transformer and electrode units, and is identical with that shown, described and claimed in the copending application of Reidar P. C. Rasmusen, Serial No. 777,868, filed October 4, 1947. The vertical slides 66 and 68 for supporting these units 70 and 72 are carried by a carriage 110 which is slidably mounted upon the bridge 74 movably supported at its ends by trucks which are movable along rails.

The pressure regulating system indicated in Fig. 1 of the drawings includes a timer 170, a power supply circuit 172, a time relay circuit 174, a high pressure timing relay circuit 176 and a reverse pressure relay circuit 178. The circuit 176 is also effective to cut out the heat control potentiometer set for the first weld pulse. It further operates a second heat control potentiometer during the high pressure application to give higher heat on the second pulse of a two-pulse weld. The reverse pressure relay circuit 178 involves a manual air valve lever 180 having an up position 182, a down position 184, and a middle or neutral position 186. This lever controls the valve 218, and effects exhaust of the reverse pressure through a limit switch which energizes the solenoid 267 to open the exhaust port 202 when the lever 180 is thrown to its down position.

The lever 180 must be in its "down" position during normal operation of the system. When moved to its "up" position 182 the electrodes are elevated substantially above normal working level to permit the clad plate to be removed or to permit the electrodes to be moved to succeeding welding positions.

The air pressure line 188 is connected through the low pressure regulator 190, the high pressure regulator 192 and the reverse pressure regulator 194, these regulators being connected respectively to the valves 196, 198 and 200. The latter is a two-way valve, normally closed, and having an "exhaust" connection 202, an "out" connection 204, and an "in" connection 206.

The reverse pressure connections to the cylinders 62 and 64 include the lines 208, 210, 212, the T 214, the check valve 216 and the valve 218 with its "exhaust" connection 220, its "out" connection 222, and "in" connection 224.

The valve 198 has an "out" connection 230 and an "in" connection 232.

The valve 196 is a normally open valve associated with a check valve 240 having an "exhaust" connection 242, an "out" connection 244, and an "in" connection 246.

The pressure regulator system is caused by the timer 170 and its various valves and connections to be effective to produce the low, high, and reverse pressures, in the sequence required.

The timer 170 is a standard N. E. M. A. type 5–B automatic repeat timer, having its cool-time circuit modified to effect the double pressure and double current welding method. The specific sequence of the resistance welding steps effected by the timer and as correlated with the double pressure and double current system will be further referred to later.

During the first pulse of the method (the first application of heating current) the normally open valve 196 (operated by solenoid 196'), (Fig. 1) allows air pressure, as regulated by the low pressure air regulator 190, to flow to the electrode pressure cylinders 62 and 64. After this pressure (i. e. about 20 p. s. i.) is put into these cylinders and the electrodes thereby caused to engage the work with the initial pressure, the timer causes the first pulse of current to flow between the electrodes and through the work. At the end of this initial current pulse high pressure air, as regulated by the high pressure regulator 192, is caused to enter the cylinders 62 and 64 by the action of the high pressure solenoid operated valve 198. This valve is operated by the cool-time delay circuit of the timer, the air line pressure being, for example, 37 pounds. At the end of the cool-time the second pulse of current is caused to flow between the electrodes and through the work while electrodes are under the higher pressure. This second pulse of current is also of a current density higher than that used during the initial current pulse.

When the two pulses of current flow are completed, and after the current is shut off, the solenoid operated two-way valve 200 releases the high pressure air from the cylinders 62 and 64 and introduces a reverse pressure which momentarily releases the pressure upon the work substantially counterbalancing the weight of the transformer-electrode assemblies and all parts vertically movable therewith. The squeeze time section of the timer then initiates a repetition of the cycle.

Figure 2:
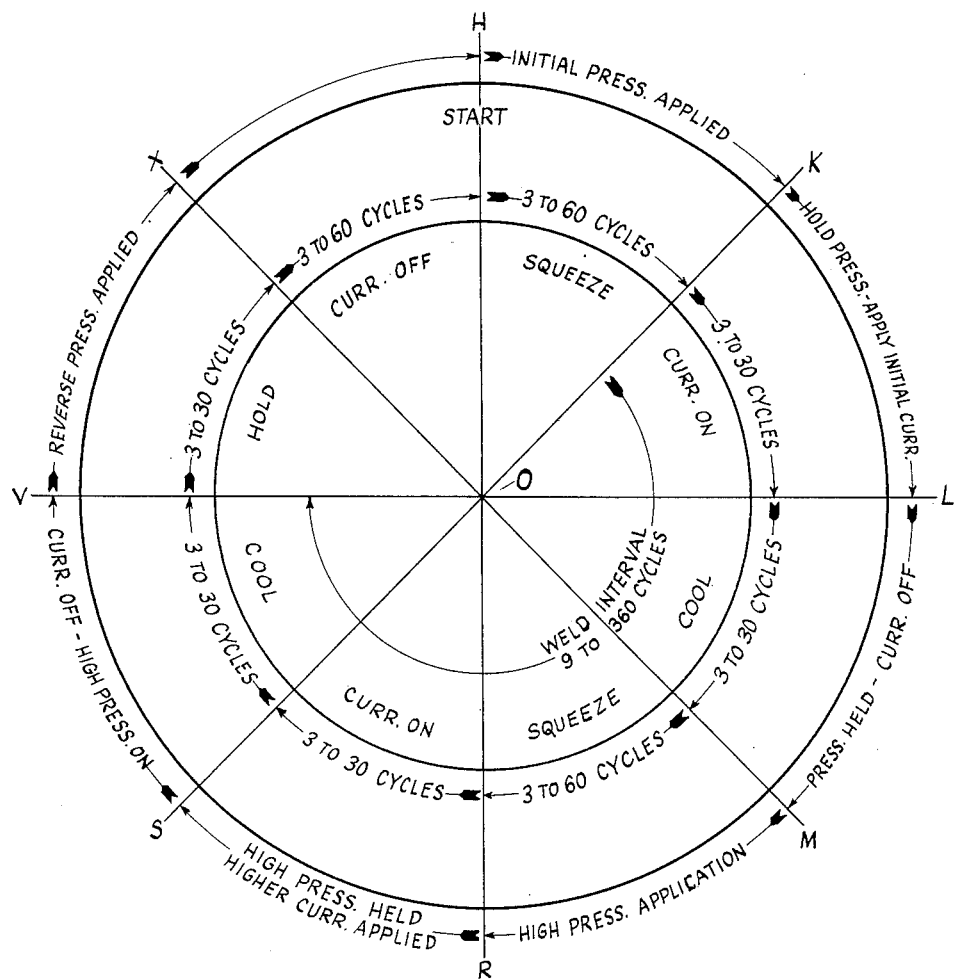
Fig. 2 is a diagrammatic figure indicating the sequence of operations effected by the timer and its associated pressure regulating system and appropriate electrical connections.

The sequence of operations effected by the timer 170 in conjunction with the pressure regulating system 60 and an appropriate system of electrical connections between the timer and the transformers, is diagrammatically illustrated in Fig. 2. In this figure, the starting position is indicated by the sector line "OH." The first action is the application of the initial electrode pressure upon the work by the timer operating through the pressure regulating system. The time for application of this pressure is indicated by the sector HOK, such time being variable, by adjustment of the timer, from 3 to 60 cycles.

The initial pressure is held during a second part of the entire sequence of operations, indicated by the sector KOL. This part of the method may be varied from 3 to 30 cycles. At the start of this part of the operation, the current for the first step of the welding is applied and held during the adjusted time indicated by the sector KOL.

At the end of the second part of the welding method represented by the sector KOL, the application of electrical current is discontinued, but the electrode pressure is held during the time represented by the sector LOM, adjustably variable from 3 to 30 cycles, as indicated. During the part of the method represented by this sector LOM, the metal is allowed to cool, this part of the method being controlled by the cool-time relay of the timer, and its electrical circuits.

The higher electrode pressure of the welding method, is applied, and held or continued through the part of the operation represented by the sector MOR and the parts represented by the immediately succeeding sectors ROS and SOV.

The time of application of the higher electrode pressure may be adjustably regulated, by adjustment of the timer, to a value within the range of from 9 to 120 cycles. When the higher pressure has been held for the squeeze time indicated by the sector MOR, the current of higher value for the second part of the pulse welding method is applied. This higher value of current continues for a period adjustably variable from 3 to 30 cycles, indicated by the sector ROS.

Immediately following the application of the higher value current for the second step of the welding method, there is a cool-time represented by the sector SOV, adjustably variable from 3 to 30 cycles.

At the end of the cool-time SOV, reverse pressure is applied to the electrode pressure cylinders 62 and 64. This pressure substantially counterbalancing the weight of the transformer-electrode assemblies is held for a time indicated by the sector VOX.

During the last part of the method, represented by the sector XOH, there is no application of the current and no application of electrode pressure.

What is claimed is:

1. A method of bonding a metal sheet to a metal plate to produce clad plate, such method comprising rolling a plurality of circular electric welding electrodes over the sheet superposed on the plate, such sheet and plate forming workpieces; at an initial spot welding zone on the sheet, applying a relatively low steady pressure to said electrodes; during continuance of such relatively low pressure application, effecting a relatively low current flow between the electrodes and the workpieces; before the electrodes have advanced substantially, applying to said electrodes a much higher steady pressure; during continuance of such higher pressure application, effecting a much higher welding current flow between the electrodes and the work to complete the weld at said zone; relieving all electrode pressure against the work while the electrodes are advancing to a next succeeding weld zone overlapping the initial zone; repeating said steps, in the order named, for the succeeding zone; and continuing said sequence of steps to form a line of overlapping spot welds.

2. A method of bonding a metal sheet to a metal plate to produce clad plate, such method comprising rolling a plurality of circular electric welding electrodes over the sheet superposed on the plate, such sheet and plate forming workpieces; at an initial spot welding zone on the sheet, applying a relatively low steady pressure to said electrodes; during continuance of such relatively low pressure application, effecting a relatively low current flow between the electrodes and the workpieces; discontinuing the current flow during a cooling time of a predetermined length; before the electrodes have advanced substantially, applying to said electrodes a much higher steady pressure; during continuance of such higher pressure application, effecting a much higher welding current flow between the electrodes and the work to complete the weld at said zone; relieving all electrode pressure against the work while the electrodes are advancing to a next succeeding weld zone overlapping the initial zone; repeating said steps, in the order named, for the succeeding zone; and continuing said sequence of steps to form a line of overlapping spot welds.

3. A method of bonding a metal sheet to a metal plate to produce clad plate, such method comprising rolling a plurality of circular electric welding electrodes over the sheet superposed on the plate, such sheet and plate forming workpieces; at an initial spot welding zone on the sheet, applying a relatively low steady pressure to said electrodes; during continuance of such relatively low pressure application, effecting a relatively low current flow between the electrodes and the workpieces; discontinuing the current flow during a cooling time of a predetermined length while maintaining said pressure application; before the electrodes have advanced substantially, applying to said electrodes a much higher steady pressure; during continuance of such higher pressure application, effecting a much higher welding current flow between the electrodes and the work to complete the weld at said zone; discontinuing said higher current flow while maintaining said higher pressure application for a predetermined time; then relieving all electrode pressure against the work while the electrodes are advancing to a next succeeding weld zone overlapping the initial zone; repeating said steps, in the order named, for the succeeding zone; and continuing said sequence of steps to form a line of overlapping spot welds.

4. A method of bonding a metal sheet to a metal plate to produce clad plate, such method comprising rolling a plurality of circular electric welding electrodes over the sheet superposed on the plate, such sheet and plate forming workpieces; at an initial spot welding zone on the sheet, applying a relatively low steady pressure to said electrodes; during continuance of such relatively low pressure application, effecting a relatively low current flow between the electrodes and the workpieces; discontinuing the current flow during a cooling time of a predetermined length while maintaining said pressure application; before the electrodes have advanced substantially, applying to said electrodes a much higher steady pressure; during continuance of such higher pressure application, effecting a much higher welding current flow between the electrodes and the work to complete the weld at said zone; discontinuing said higher current flow while maintaining said higher pressure application for a predetermined time; then relieving all electrode pressure against the work while the electrodes are advancing to a next succeeding weld zone overlapping the initial zone; repeating said steps, in the order named, for the succeeding zone; continuing said sequence of steps to form a line of overlapping spot welds; and then similarly forming parallel and closely spaced rows of similar overlapping welds in the workpieces.

FRANK W. ARMSTRONG, Jr.

REFERENCES CITED

The following references are of record in the file of this patent:

UNITED STATES PATENTS

| Number | Name | Date |
|---|---|---|
| 2,214,002 | Trainer et al. | Sept. 10, 1940 |
| 2,272,968 | Dyer | Feb. 10, 1942 |
| 2,275,419 | Carpenter | Mar. 10, 1942 |
| 2,423,067 | Hansen et al. | June 24, 1947 |

OTHER REFERENCES

"Machinery," October, 1944, page 158.